July 24, 1956 W. T. SPAEDER 2,755,560
LIQUID LEVEL
Filed Feb. 9, 1953
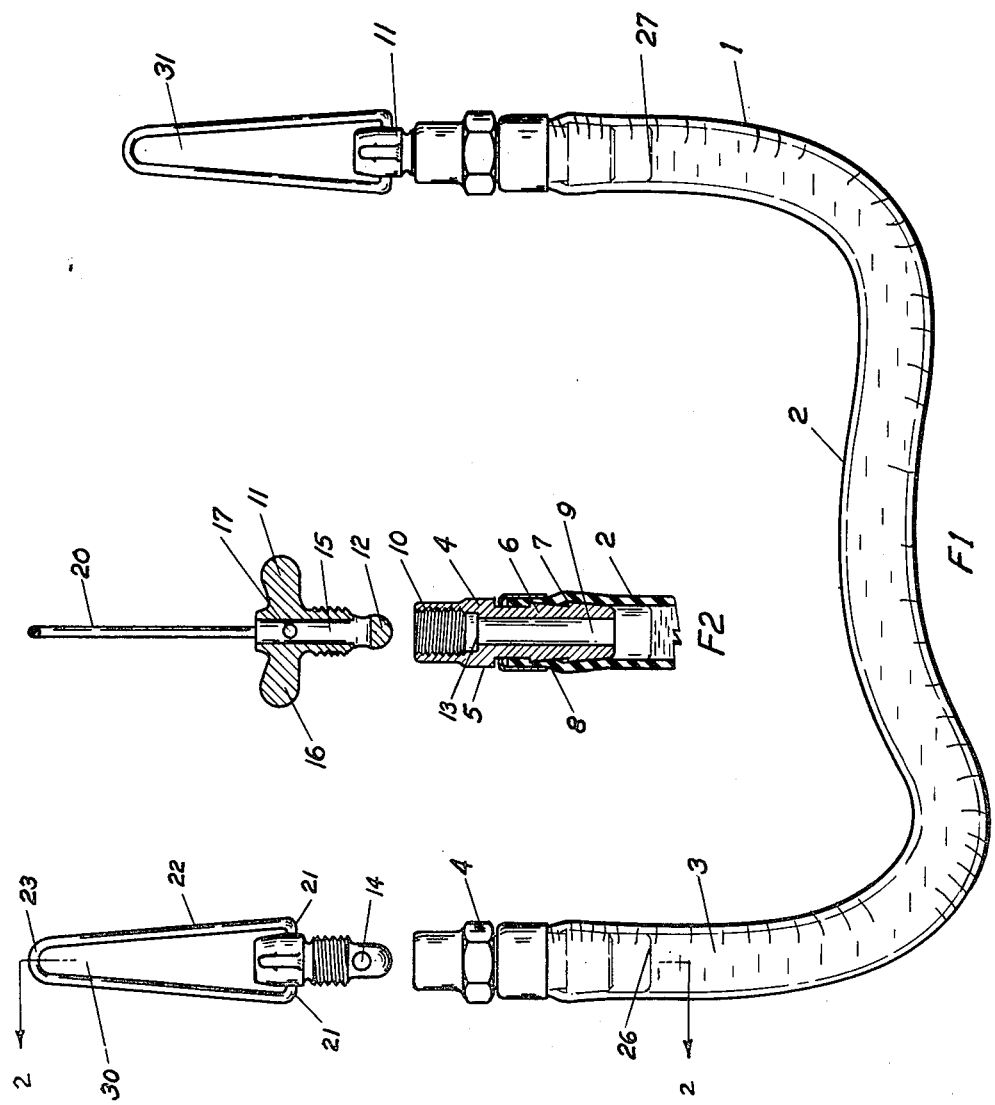
William T. Spaeder Inventor
By Charles L. Lovercheck
Attorney

United States Patent Office 2,755,560
Patented July 24, 1956

2,755,560

LIQUID LEVEL

William T. Spaeder, Erie, Pa.

Application February 9, 1953, Serial No. 335,709

2 Claims. (Cl. 33—209)

This invention relates to a liquid level.

In leveling devices according to previous designs, a liquid has been contained in a non-transparent tube and sight glasses have been attached to the ends of the tubes or hoses. The sight glasses were subject to breakage during usage and, further, required a more expensive manufacturing cost because of the additional parts required.

One of the greatest objections and disadvantages of the prior types of levels is done away with because the levels made according to previous designs had sight glasses made of fragile material on the ends thereof which rendered them very delicate and vulnerable to breakage. By providing a valve and bail attached at each end of my level, a convenient means for supporting the end of the level is provided and the bail serves a further function of providing a handle for tightening the valve. An additional disadvantage of former leveling devices was that the tubing was made of non-transparent material and if an air bubble became entrapped in the fluid, error was introduced into the result obtained from the use of the instrument and an erroneous reading introduced in the result. By the use of my transparent hose, an air bubble is readily detected in the liquid and it can be removed before the instrument is used, thereby insuring accurate results. Further, by elimination of all rigid glass and other materials any appreciable length from the ends of my level, I am able to provide a much more convenient container for storing the level and thereby increase the utility of the level by making it easier to transport.

It is, accordingly, an object of my invention to overcome the above and other defects in previous devices by providing a liquid leveling device which will be economical to manufacture, convenient to use, and free from the defects of previous devices.

Another object of the invention is to provide a liquid leveling device made of a flexible piece of transparent tubing.

Another object of the invention is to provide a liquid level which has none of its component parts manufactured from glass.

Another object of the invention is to provide a leveling device which may be used in leveling different points in a building or a terrain, regardless of obstructions between the points.

With the above and other objects in view, the present invention consists of the combination and arrangement of parts hereinafter more fully described, illustrated in the accompanying drawing, and more particularly pointed out in the appended claims, it being understood that changes may be made in the form, size, proportion, and minor details of construction without departing from the spirit or sacrificing any of the advantages of the invention.

In the drawing:

Fig. 1 is a view of the leveling device according to the invention; and

Fig. 2 is a detailed cross sectional view of one end of the leveling device.

Now with more specific reference to the drawing, the leveling device 1 is made up of the hose 2 made of transparent material and filled with a colored liquid 3. Coupling members 4 are attached to the end of the hose. The coupling members 4 have a hexagonal portion 5 and a serrated portion 6 having serrations 7 for engaging the end 8 of the hose 2. The coupling member has a hollow bore 9 and a threaded portion 10 for engagement with a valve 11. The valve 11 has a round end portion 12 which engages the seat 13 in the coupling member 4. The lateral holes 14 communicate with the bore 15 of the valve to allow air to escape from the ends of the hose through the holes 14 and the bore 15. The valve has the wings 16 for convenience in grasping the valve to tighten it. Lateral holes 17 are provided in the valve to accommodate the bail portion 20.

The valve 11 has the bail 20 having the inwardly directed ends 21 bent at substantially right angles to the side members 22. The side members 22 are connected in U-shaped fashion at 23.

The bail 20 forms a convenient means for supporting the end of the liquid level on a nail or other convenient fastening means when the level is being used inside a building or outside. If used outside, a nail can be driven in a post or a stick to support the end of the level.

In use, the hose 2 is filled with a colored liquid having a high freezing point such as alcohol or glycerine with a green color added thereto. The valves 11 at the ends are loosened to allow the air pressure at the ends of the liquid to be relieved. It is obvious that the levels of the liquid at 26 and 27 will be at equal level. If the ends 30 and 31 are supported, the level of the liquid at 26 will be exactly equal to the level of the liquid at 27. Then if the level of liquid at 26 is held at a reference point and the end 31 is supported, the level of the liquid at 27 will indicate a point that is of exactly the same elevation or level as the point 26.

During use of my novel level in leveling a terrace, I support the end 30 on a nail in a stick such as a surveyor's range pole. Then I grasp the end 31 and note the level of the liquid at 27 and know that the difference of the distance between the level at 27 and the ground and the difference from the level 26 and the ground is equal to the distance in elevation of the two points. By progressively moving from one point to another on a terrace, I can establish the levels of each point.

This level does not require the assistance of two operators and it is very simple and practically foolproof in use. My novel liquid level is a departure from former designs and eliminates the greatest objections to the usage of a liquid level as a practical instrument.

When the valves at the ends are closed, the level can be coiled up and stored in a compact manner in a box or it can be stored in a shop or warehouse or transported in a truck without concern about breakage since there are no fragile parts involved.

In the foregoing specification, I have set forth the invention in its preferred practical forms but I am aware that the structure shown is capable of modification within a range of equivalents without departing from the invention which is to be understood is broadly novel as is commensurate with the appended claims.

What I claim is:

1. A leveling instrument comprising a transparent tubular member, a liquid in said member and partially filling said member, the end surface of said liquid being adapted to be disposed adjacent the end of said member, a valve attached to one end of said tubular member, and a bail attached to said valve, said bail comprising a generally U-shaped member having its ends turned inward to engage said valve.

2. A leveling instrument comprising a transparent tubular member, a colored liquid in said member and partially filling said member, the end surface of said liquid being adapted to be disposed adjacent the end of said member, a valve attached to one end of said tubular member, and a bail attached to said valve, said bail comprising a generally U-shaped member having its ends turned inward to engage said valve.

References Cited in the file of this patent

UNITED STATES PATENTS

| | | |
|---|---|---|
| 532,949 | Darragh | Jan. 22, 1895 |
| 601,629 | Castor | Apr. 5, 1898 |
| 906,524 | Goerigk | Dec. 15, 1908 |
| 1,598,931 | Patche | Sept. 7, 1926 |
| 2,150,048 | Boyd | Mar. 7, 1939 |
| 2,308,088 | Liverman | Jan. 12, 1943 |
| 2,612,336 | Tuttle | Sept. 30, 1952 |
| 2,641,061 | Schmidt | June 9, 1953 |

FOREIGN PATENTS

| | | |
|---|---|---|
| 571,846 | France | Feb. 9, 1924 |